(12) United States Patent
Smuk

(10) Patent No.: US 6,328,381 B1
(45) Date of Patent: Dec. 11, 2001

(54) SINGLE CONTROL HANDLE RELEASE MECHANISM FOR USE WITH A VEHICLE SEAT

(75) Inventor: Wojciech Smuk, Troy, MI (US)

(73) Assignee: Bertrand Faure Components Ltd., Mississauga (CA)

( * ) Notice: Subject to any disclaimer, the term of this patent is extended or adjusted under 35 U.S.C. 154(b) by 0 days.

(21) Appl. No.: 09/402,655
(22) PCT Filed: Apr. 7, 1998
(86) PCT No.: PCT/CA98/00332
§ 371 Date: Oct. 8, 1999
§ 102(e) Date: Oct. 8, 1999
(87) PCT Pub. No.: WO98/45136
PCT Pub. Date: Oct. 15, 1998

Related U.S. Application Data
(60) Provisional application No. 60/043,071, filed on Apr. 8, 1997.

(51) Int. Cl.[7] .................................................. B60N 2/02
(52) U.S. Cl. ..................... 297/365; 297/367; 297/378.12
(58) Field of Search .................................... 297/341, 367, 297/366, 365, 368, 369, 378.1, 378.11, 378.12, 378.14, 353, 452.2, 452.18

(56) References Cited

U.S. PATENT DOCUMENTS 3,900,225 * 8/1975 Wirtz et al. .......................... 297/367
4,268,086 * 5/1981 Okuyama ......................... 297/367 X
4,484,779 * 11/1984 Suzuki .................................. 297/326
4,629,252 * 12/1986 Myers et al. ..................... 297/367 X
4,634,180 * 1/1987 Zaveri et al. ................ 297/378.12 X
4,822,100 * 4/1989 Bell ...................................... 297/367
5,052,748 * 10/1991 Fourrey et al. ...................... 297/124
6,139,104 * 10/2000 Brewer et al. ............. 297/378.12 X
6,152,533 * 11/2000 Smuk .................................. 297/341

FOREIGN PATENT DOCUMENTS 38 28 659 A    3/1989  (DE) .
41 35 421 A    8/1992  (DE) .

* cited by examiner

Primary Examiner—Peter M. Cuomo
Assistant Examiner—Stephen Vu
(74) Attorney, Agent, or Firm—Patrick J. Hofbauer

(57) ABSTRACT

A single control handle release mechanism for a vehicle seat hinge has a mounting plate attachable to seat cushion, a sector plate pivotally mounted on the mounting plate for selective pivotal movement about a first lower pivot axis, and a rotational control plate pivotally mounted on the sector plate for selective pivotal movement about a second upper pivot axis and attachable to a seatback. The vehicle seatback is pivotally movable about the first lower pivot axis between a plurality of angular positions and forwardly foldable about the second upper pivot axis between a design position and a forwardly dumped position. The release mechanism comprises a primary latch that pivotally fixes the sector plate with respect to the mounting plate, and a secondary latch that pivotally fixes the rotational control plate with respect to the sector plate. A manually grippable handle effects latched and unlatched configurations of the primary latch.

15 Claims, 17 Drawing Sheets

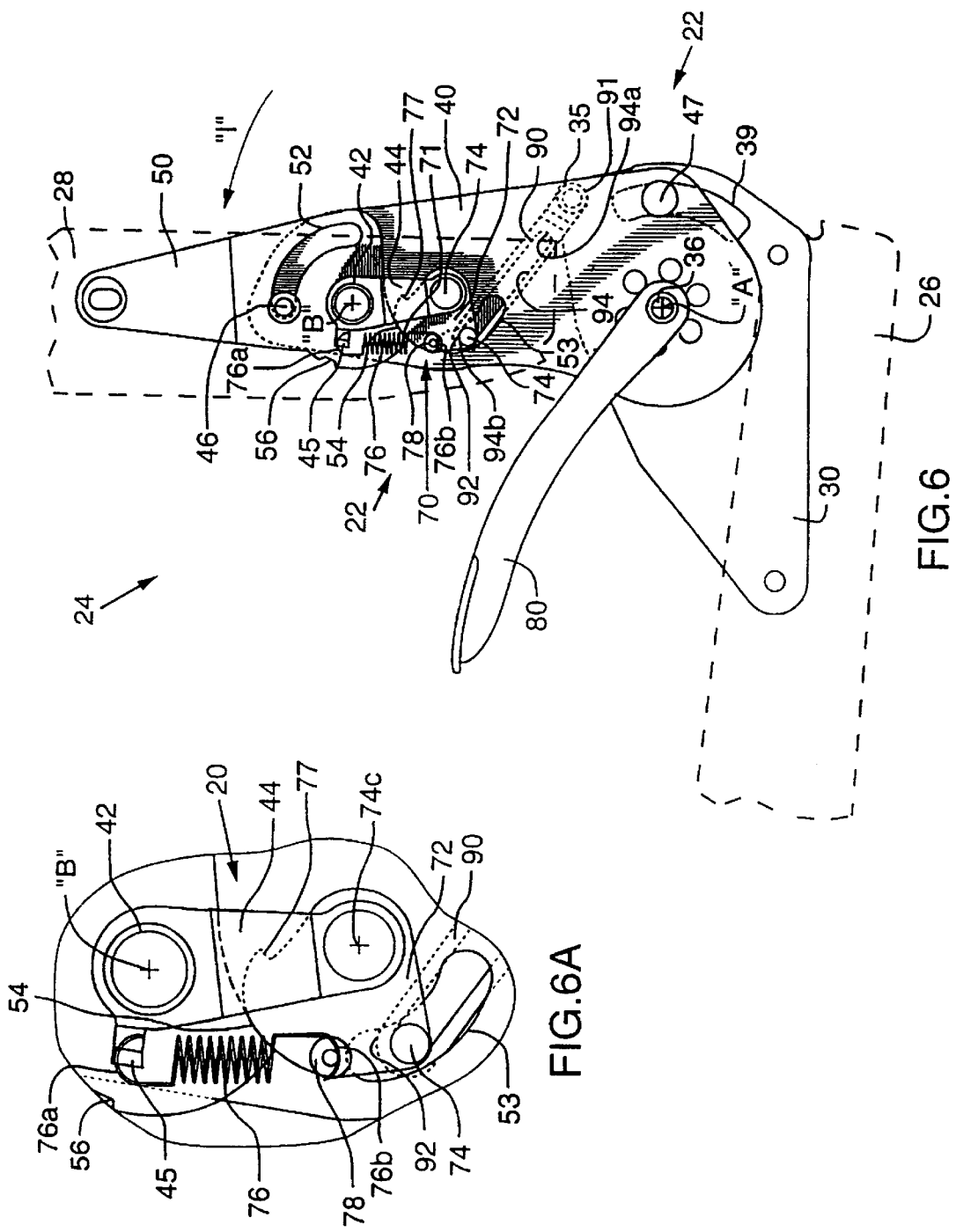

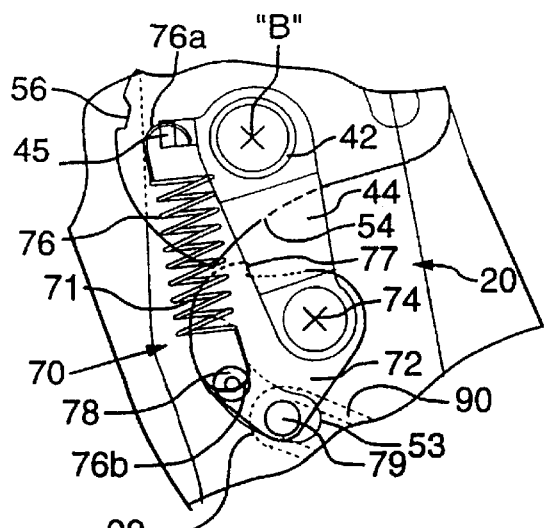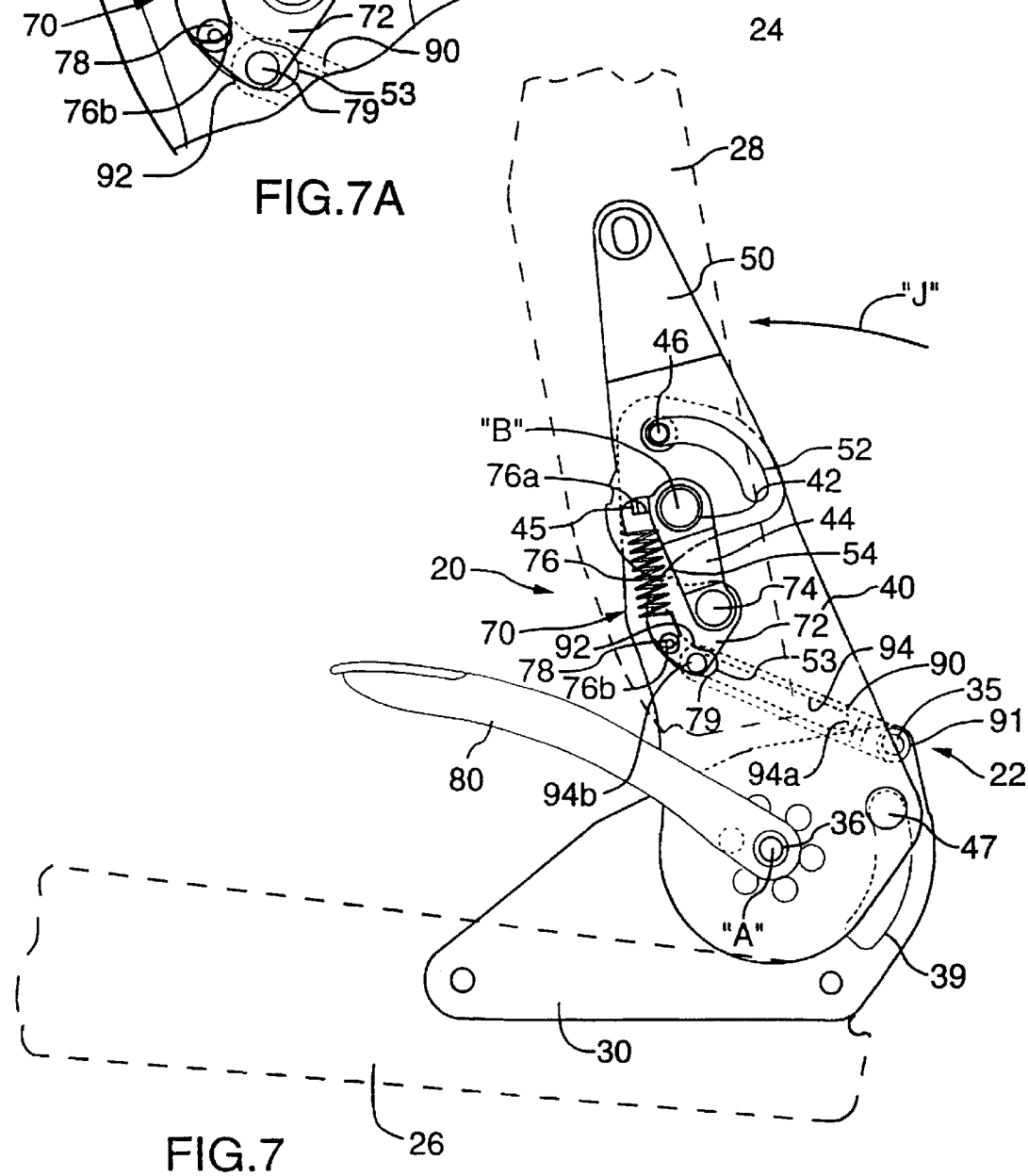

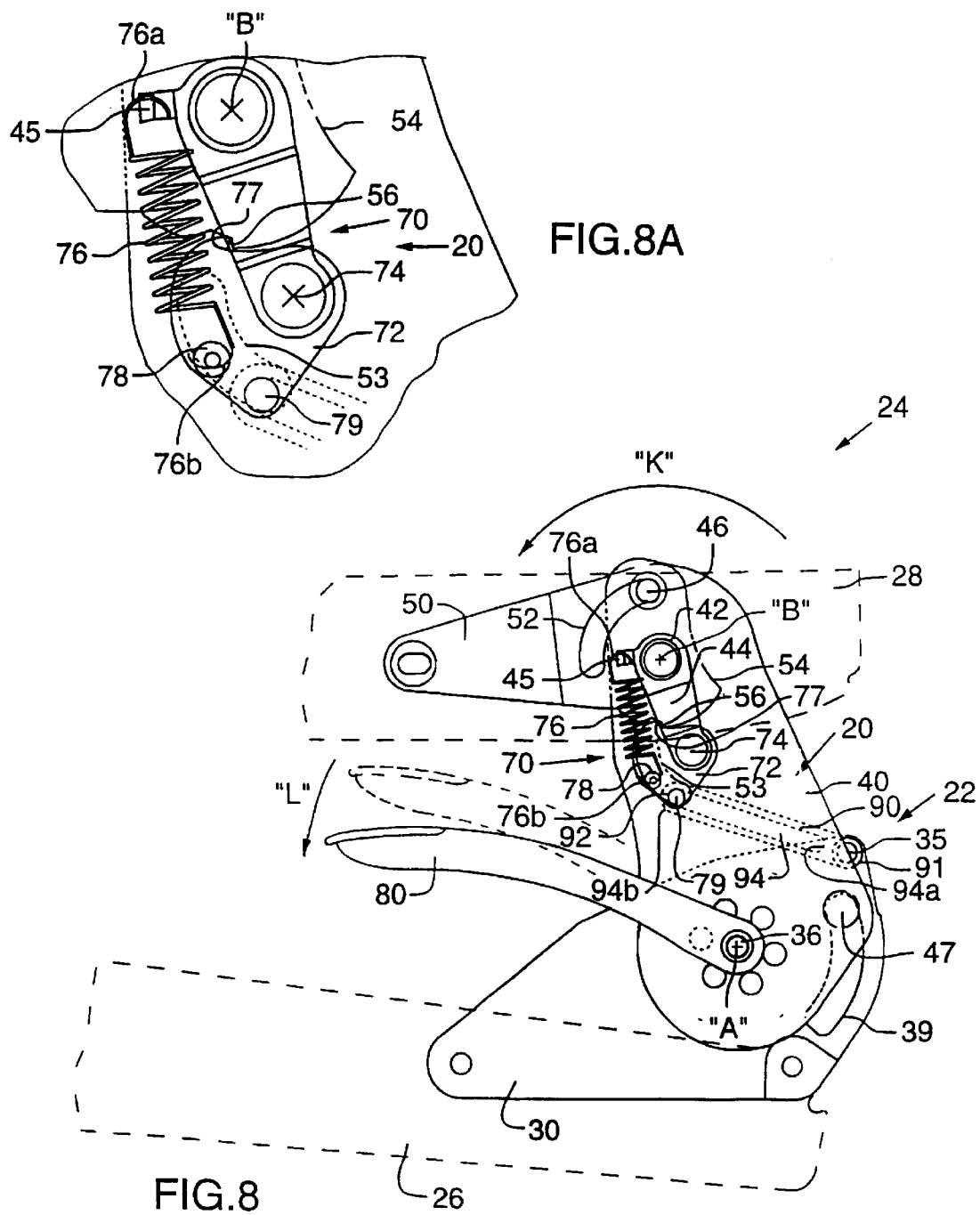

SINGLE CONTROL HANDLE RELEASE MECHANISM FOR USE WITH A VEHICLE SEAT

"This application claims the benefit of U.S. Provisional Application No. 60/043,071, filed Apr. 8, 1997."In addition, this application is a 371 of PCT/CA98/00332, filed on Apr. 7, 1998.

FIELD OF THE INVENTION

The present invention relates to release mechanisms for use with vehicle seat hinges having two pivot axes to permit a seatback to recline and to forwardly fold to a horizontal forwardly dumped position, and more particularly to single control handle release mechanisms for use with such vehicle seat hinges.

BACKGROUND OF THE INVENTION

Passenger vehicles, especially combined passenger and utility type vehicles, commonly have front and rear seats that both recline and fold forwardly to a substantially horizontally disposed forwardly dumped position, as selected by a user, in order to accommodate increasing demand for more functional vehicle interiors. Placing a vehicle seat in its forwardly folded dumped position allows for carrying of large or lengthy objects inside the vehicle and provides a convenient substantially horizontal flat surface for articles that might be used in a vehicle, such as briefcases, laptop computers, and also food and drinks.

Various prior art vehicle seats exist, which vehicle seats fold forwardly to a substantially horizontally disposed forwardly dumped position. Such vehicle seats typically include a pair of vehicle seat hinges, with each hinge having a mounting plate securely attached to a vehicle seat cushion. A sector plate associated with the seatback is pivotally mounted on the mounting plate for pivotal movement about a lower pivot axis. A rotational control plate is pivotally mounted on the sector plate for pivotal movement about an upper pivot axis and is securely attached to a vehicle seatback.

In such prior art vehicle seats, the seatback is selectively pivotally movable about the lower pivot axis between a plurality of angular positions, typically including a plurality of reclining positions and also a plurality of partially forwardly (of vertical) inclined positions. The seatback is also forwardly foldable about the upper pivot axis between a design position and a forwardly dumped position, whereat the rear surface of the seatback is substantially horizontally disposed.

In the prior art, in order to permit selection and control of the reclining and forward folding of the vehicle seatback about two substantially parallel pivot axes, one or more manually manipulable handle release mechanisms are used.

One single release mechanism for this purpose is disclosed in U.S. Pat. No. 5,052,748 (Fourrey et al). As taught therein, when the seatback is in a rearwardly reclined position, a pawl mechanism locks out a portion of the seatback pivot mechanism, thus precluding forward dumping of the seatback over the seat cushion. When the seatback is in an upright design position, in order to forwardly fold the seatback over the seat cushion, a single manually actuatable lever arm is lifted, thus immediately and concurrently releasing the seatback for rotation, either forwardly about both the lower and upper pivot axes, or for reclining about the lower pivot axis. Such immediate and concurrent releasing is highly undesirable, as it precludes separate control of the reclining function.

Another such release mechanism is shown in U.S. Pat. No. 4,484,779 (Suzuki), wherein a conventional release mechanism is used to selectively release a seatback for reclining or initial forward folding with respect to a vehicle seat cushion. After initial forward folding of the seatback, an isolated pin on the the seat cushion is engaged by a separate latch rotatably mounted on the seatback.

In both of these prior art patents, there is no direct link or connection between the seat cushion and the upper pivot axis of the seatback, which is highly undesirable. Further, it is necessary to perform initial forwardly folded movement of the seatback forwardly of the design position in order to permit the seatback to be moved to the fully forwardly dumped position.

It is an object of the present invention to provide a single control handle release mechanism for use with a vehicle seat hinge, which release mechanism is actuatable through manual manipulation of single control handle.

It is another object of the present invention to provide a single control handle release mechanism for use with a vehicle seat hinge, which release mechanism is actuatable through manual manipulation of a single control handle without requiring significant initial forward folding of the seatback, forward of the design position.

It is a further object of the present invention to provide a single control handle release mechanism for use with a vehicle seat hinge, which release mechanism is simple and inexpensive to manufacture.

It is yet another object of the present invention to provide a single control handle release mechanism for use with a vehicle seat hinge, which release mechanism is intuitive to operate.

SUMMARY OF THE INVENTION

In accordance with the present invention there is disclosed a single control handle release mechanism for use with a vehicle seat hinge having a mounting plate securely attachable to a vehicle seat cushion, a sector plate pivotally mounted on the mounting plate for selective pivotal movement about a first lower pivot axis, and a rotational control plate pivotally mounted on the sector plate for selective pivotal movement about a second upper pivot axis and securely attachable to a vehicle seatback. When the vehicle seat hinge is installed in a vehicle seat, the vehicle seatback is pivotally movable with respect to the vehicle seat cushion about the first lower pivot axis between a plurality of angular positions and forwardly foldable with respect to the vehicle seat cushion about the second upper pivot axis between a design position and a forwardly dumped position. The single control handle release mechanism comprises a primary latch means operatively interconnected between the mounting plate and the sector plate so as to be selectively movable between a latched configuration whereat the mounting plate and the sector plate are pivotally fixed one with respect to the other, and an unlatched configuration whereat the mounting plate and the sector plate are free to pivot about the first lower pivot axis such that the vehicle seatback is pivotally movable, as aforesaid, between the plurality of angular positions. A secondary latch means is operatively interconnected between the sector plate and the rotational control plate so as to be selectively movable between a latched configuration whereat the sector plate and the rotational control plate are pivotally fixed one with respect to the other, and an unlatched configuration whereat the sector plate and the rotational control plate are free to forwardly fold, as aforesaid, between the design position and the forwardly dumped position. A manually grippable handle means is rotatably mounted on the seat cushion and operatively connected to the primary latch means, for movement from an initial position, corresponding to the latched configuration of the primary latch means and the latched configuration of the secondary latch means, to a first release position, at which first release position the manually grippable handle means effects the unlatched configuration of the primary latch means, thereby permitting pivotal folding, as aforesaid, of the vehicle seatback about the first lower pivot axis between the plurality of angular positions. A link arm means is operatively interconnected between the secondary latch means and the vehicle seat cushion for movement of the secondary latch means from the latched configuration to the unlatched configuration upon relative movement of the link arm means and the secondary latch means with respect to each other beyond a threshold position, thereby to release the vehicle seatback to be forwardly foldable over the vehicle seat cushion about the second upper pivot axis, as aforesaid. The first end of the link arm is pivotally mounted, as aforesaid, on the mounting plate and the relative movement of the link arm and the secondary latch means with respect to each other occurs upon forwardly folded pivotal movement of the vehicle seatback about the first lower pivot axis following the movement of the handle means to the first released position.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the single control handle release mechanism for use with a vehicle seat hinge, according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings:

FIG. 6 is a view similar to FIG. 3, but with the seatback having been initially folded forwardly about the first lower pivot axis, and with the link arm means and the secondary latch means in a threshold position;

FIG. 6A is an enlarged view of a portion of FIG. 6, showing the secondary latch means in a latched configuration;

FIG. 7 is a view similar to FIG. 6, but with the seatback folded forwardly slightly more than FIG. 6 about the first lower pivot axis;

FIG. 7A is an enlarged view of a portion of FIG. 7, showing the secondary latch means in an unlatched configuration;

FIG. 8 is a view similar to FIG. 7, but with the seatback folded forwardly about the first lower pivot axis to a substantially horizontal forwardly dumped position;

FIG. 8A is an enlarged view of a portion of FIG. 8, showing the secondary latch means in a latched configuration;

DETAILED DESCRIPTION OF A PREFERRED EMBODIMENT

Figure 1:
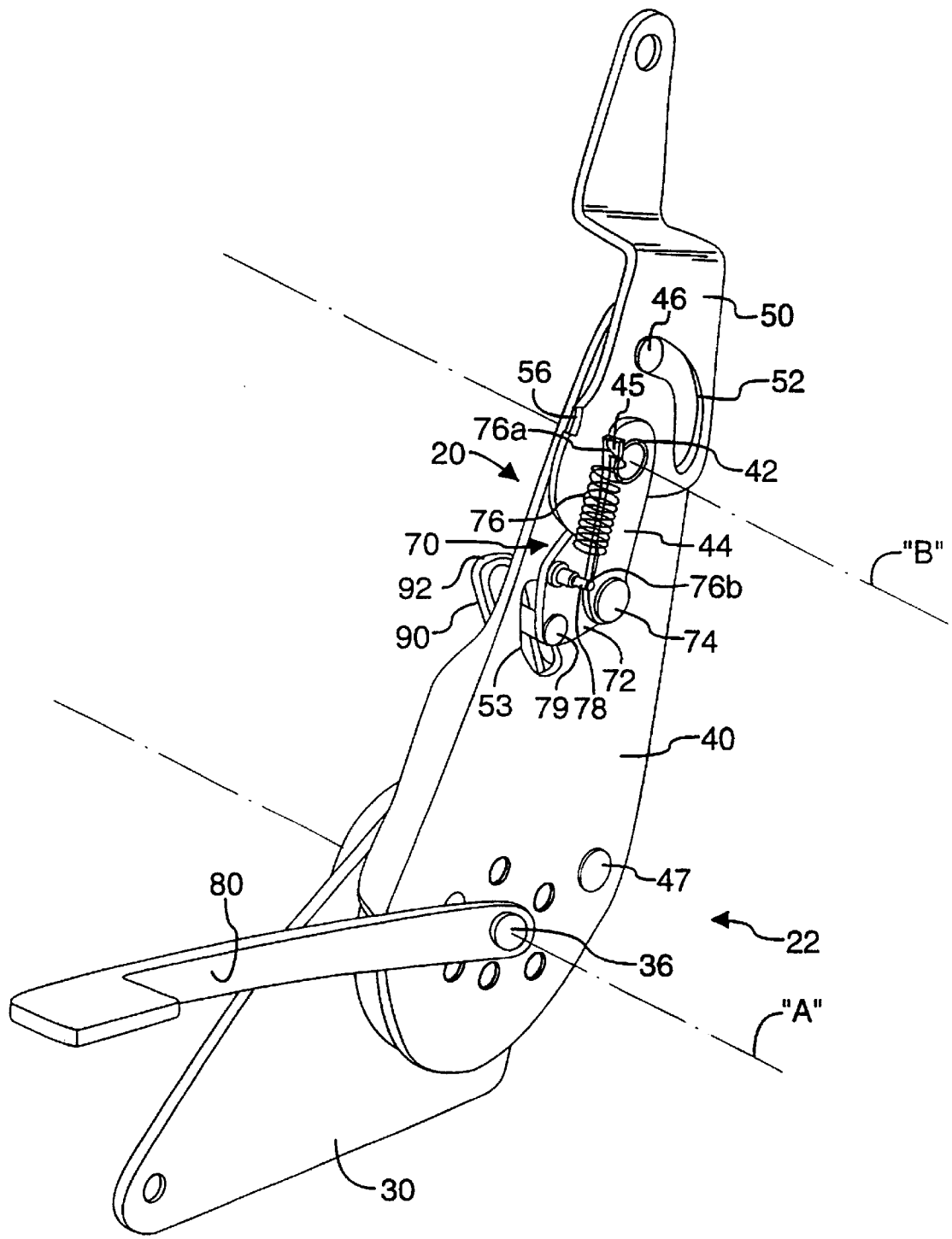
FIG. 1 is a perspective view from the front left of a first embodiment of a single control handle release mechanism according to the present invention.
Figure 2:
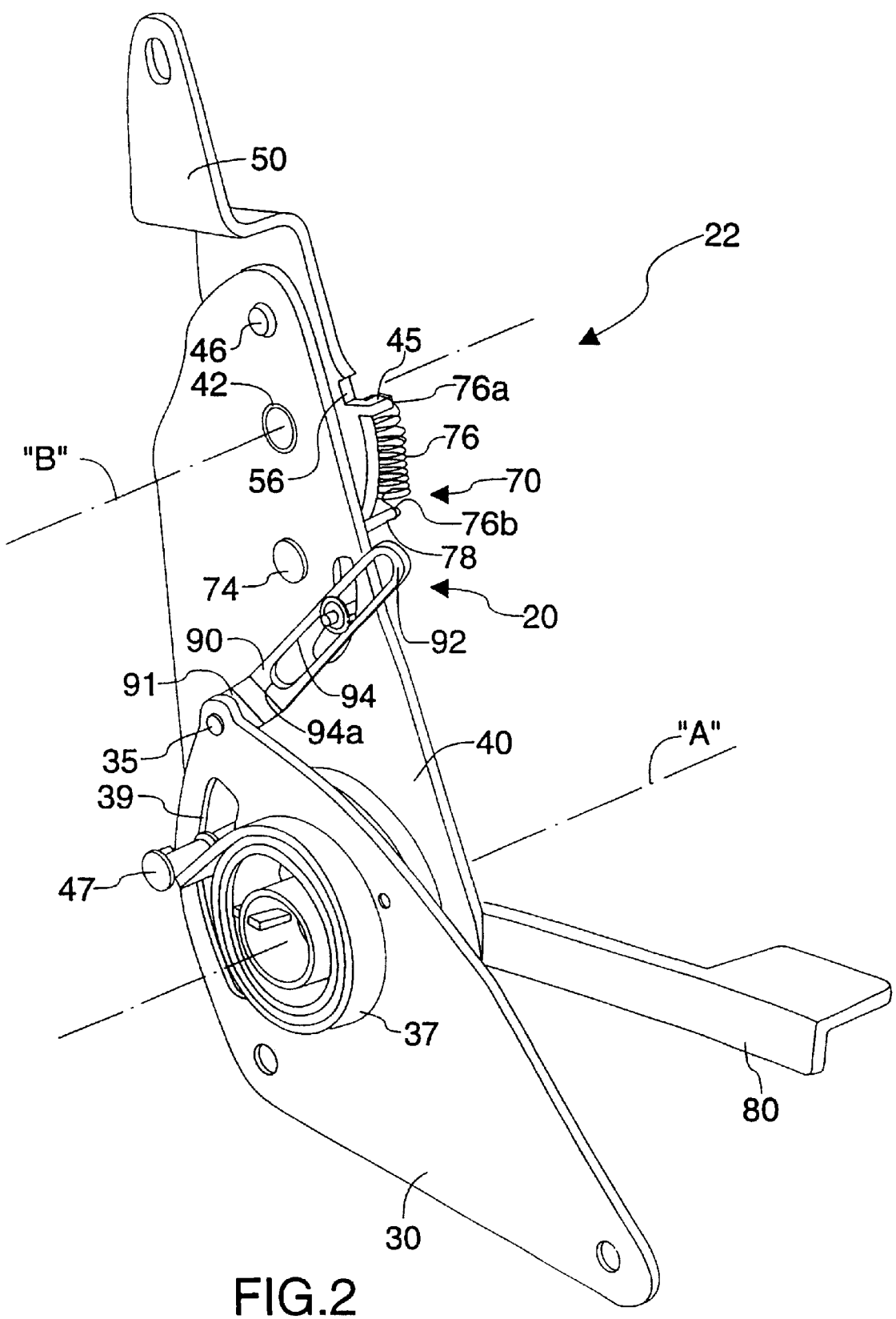
FIG. 2 is a perspective view from the front right of the embodiment of the single control handle release mechanism of FIG. 1.

Referring now to FIGS. 1 through 17 of the drawings, there is shown a first, second, and third embodiments of the single control handle release mechanism of the present invention, which embodiments will each be described separately in this specification. Common reference numerals are used in the Figures to denote like parts, from one embodiment to the next.

Referring now to FIGS. 1 through 8A of the drawings, there is shown a first embodiment of the single control handle release mechanism of the present invention, as indicated by the general reference numeral 20. As can be best seen in FIGS. 3, 4, 5, 6, 7, and 8, the single control handle release mechanism 20 is for use with a vehicle seat hinge, as indicated by the general reference numeral 22, installed in a vehicle seat, as indicated by the general reference numeral 24. The vehicle seat hinge 22 has a mounting plate 30 securely attachable to a vehicle seat cushion means 26 (shown in dashed lining) by conventional fastening means (not shown), as is well known in the art. A sector plate 40 is pivotally mounted on the mounting plate 30, by means of a pin member 36, for selective pivotal movement about a first lower pivot axis "A". A rotational control plate 50 is pivotally mounted on the sector plate 40 by a pin member 42 and is retained in place by a mounting bracket 44, for selective pivotal movement about a second upper pivot axis "B" as limited by a sectoral slot 52 in the rotational control plate 50 engaged by a stop pin 46 securely mounted on the sector plate 40. The rotational control plate 50 is securely attachable to a vehicle seatback means 28 (shown in dashed lining) by conventional fastening means (not shown), as is well known in the art.

Figure 3:
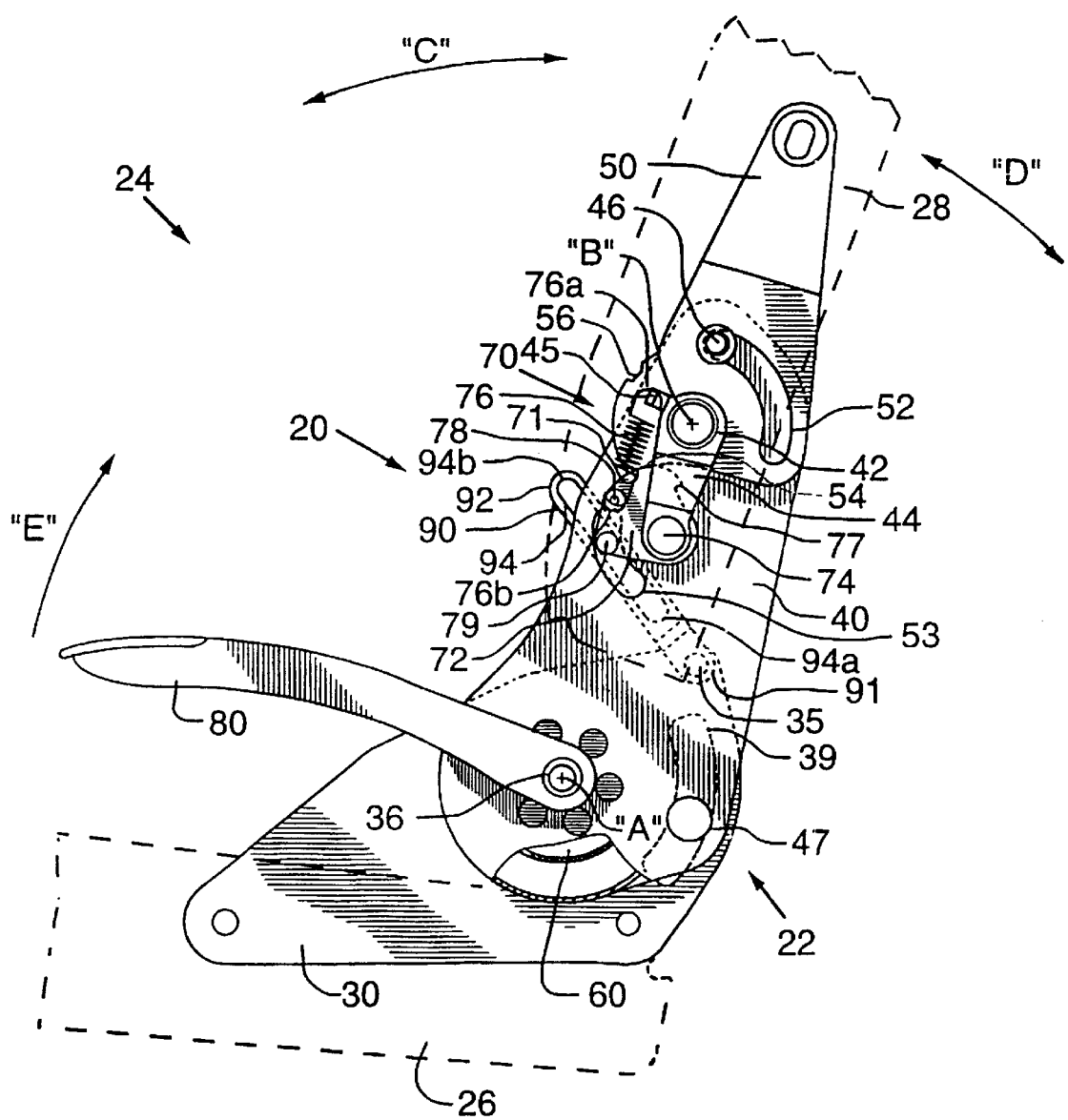
FIG. 3 is a left side elevational view of the embodiment of single control handle release mechanism of FIG. 1, with the single control handle release mechanism installed in a vehicle seat and with the seatback of the seat in an upright design position.

When the vehicle seat hinge 22 is installed in the vehicle seat 24, the vehicle seatback means 28 is pivotally movable with respect to the vehicle seat cushion means 26 about the first lower pivot axis "A" between a plurality of angular positions, including return forwardly folding movement, as indicated by double ended arrow "C" in FIG. 3, or return reclining movement, as indicated by double ended arrow "D" in FIG. 3. Such angular positions include a substantially upright occupiable position, as can be best seen in FIGS. 3 and 4, various reclined positions, one of which reclined positions is shown in FIG. 5, and also include partially forwardly angled positions, as can be best seen in FIGS. 6 and 7. The reclined positions and the partially forwardly angled positions are limited by a stop pin 47 securely mounted on the sector plate 40 so as to engage a sectoral slot 39 in the mounting plate 30. The vehicle seatback means 28 is also forwardly foldable with respect to the vehicle seat cushion means 26 about the second upper pivot axis "B" between a design position, as can be best seen in FIGS. 3 and 4, and a forwardly dumped position, as can be best seen in FIG. 8.

The single control handle release mechanism 20 comprises a primary latch means, as indicated by the reference numeral 60, operatively interconnected between the mounting plate 30 and the sector plate 40 and actuated by a manually grippable handle means 80. In the preferred embodiments as illustrated, the primary latch means 60 comprises a known reclining adjustment mechanism that has a cam (not shown) rotatable by manipulation of the handle means 80. The cam effects radially inward and outward movement of a plurality of toothed latching pawls (not shown) within the primary latching means 60 and associated with the seat cushion means 26 into engagement and out of engagement with a co-operating annular ring gear (not shown) also within the primary latching means 60 and associated with the seatback means 28. Examples of modern versions of such a primary latch means 60 can be found in U.S. Pat. No. 5,526,970 (Kienke et al) and European Patent No. 808,742 (Rohee).

The primary latch means 60 is selectively movable between a latched configuration and an unlatched configuration. In the latched configuration, the mounting plate 30 and the sector plate 40 are pivotally fixed one with respect to the other, and the seatback means 28 is precluded from pivotal movement about the first lower pivot axis "A", as aforesaid. In the unlatched configuration, the mounting plate 30 and the sector plate 40 are free to pivot about the first lower pivot axis "A" such that the vehicle seatback means 28 is pivotally movable, as aforesaid, between the plurality of angular positions, as can be best seen in FIGS. 3, 4, 5, 6, and 7.

A secondary latch means designated by the general reference numeral 70 is operatively interconnected between the sector plate 40 and the rotational control plate 50 so as to be selectively movable between a latched configuration, as can be best seen in FIGS. 1 through 6, and an unlatched configuration, as can be best seen in FIGS. 7 through 8. When the secondary latch means 70 is in the latched configuration, the sector plate 40 and the rotational control plate 50 are pivotally fixed one with respect to the other. When the secondary latch means 70 is in the unlatched configuration, the sector plate 40 and the rotational control plate 50 are free to forwardly fold about the second upper pivot axis "B", as aforesaid, between the design position, as can be best seen in FIGS. 1 through 6, and the forwardly dumped position, as can be best seen in FIG. 8.

In the first embodiment, the secondary latch means 70 essentially comprises a cam member 72 rotatably mounted on the sector plate 40 by a pin member 74, and retained in place by the mounting bracket 44, for pivotal movement between a latched configuration, as can be best seen in FIGS. 1 through 6, and especially FIG. 6A, and an unlatched configuration, as can be best seen in FIGS. 7 and 8, and especially FIG. 7A. The cam member 72 is spring biased toward its latched configuration by a spring member 76 having a first end 76a mounted on a lug 45 formed on the mounting bracket 44 and a second end 76b mounted on a post 78 projecting outwardly from the cam member 72. The pivotal movement of the cam member 72 is limited by a sectoral slot 53 in the rotational control plate 50 engaged by a stop pin 79 securely mounted on the cam member 72.

The latched configuration of the cam member 72 corresponds to the latched configuration of the secondary latch means 70 and the unlatched configuration corresponds to the unlatched configuration of the secondary latch means 70. In the latched configuration of the cam member 72, a camming surface 71 on the cam member 72 latchingly engages a co-operating cam receiving surface 54 on the rotational control plate 50. In the unlatched configuration of the cam member 72, the camming surface 71 is removed from being latchingly engaged with the cam receiving surface 54.

The secondary latch means 70 further comprises means for releasably locking the vehicle seatback means 28 in the forwardly dumped position shown in FIG. 8. In the first embodiment, the means for releasably locking the vehicle seatback means 28 in the forwardly dumped position comprises a notch 56 disposed in the rotational control plate 50 and a projecting tooth member 77 disposed on the cam member 72 for co-operative interlocking with the notch 56 when the vehicle seatback means 28 is in the forwardly dumped position. As can be best seen in FIG. 8A, the co-operating profiles of the notch 56 and the tooth member 77 are shaped such that lifting of the seatback means 28 with only slightly more than a minimal force in a rotational direction opposite to that of arrow "K" in FIG. 8, causes unlocking of the notch 56 and the tooth member 77 with respect to each other, thus permitting the seatback to be pivoted about the second upper pivot axis "B", in the same rotational direction, so as to be returned from its forwardly folded position to its design position, as can be best seen in FIG. 6.

The manually grippable handle means 80 is mounted on the seat cushion means 26 via the pin member 36 so as to cause rotation of the pin member 36 upon rotation of the handle means 80. Such rotation of the pin member 36 causes selective latching and unlatching of the primary latch means 60, as is generally known in the art. The manually grippable handle means 80 is mounted for rotatable movement with the pin member, as indicated by arrows "E", "F", and "G" in FIGS. 3, 4, and 5, respectively, from an initial position, as is shown in solid lining in FIGS. 3, 4, and 8, and as is shown in dashed lining in FIG. 5, to a first release position, as is shown in solid lining in FIGS. 5 through 7, and as is shown in dashed lining in FIG. 8. The manually grippable handle means 80 is thus used to selectively move the primary latch means 60 from the latched configuration to the unlatched configuration, thus permitting reclining of the vehicle seatback means 28, as indicated by arrow "H" in FIG. 5, or to permit initial forward folding of the vehicle seatback means 28, as indicated by arrows "I" and "J" in FIGS. 6 and 7, respectively. The manually grippable handle means 80 is preferably spring biased towards its initial position by internal springs (not shown) positioned within the primary latch means 60.

A clock spring 37 interconnected between the pin member 47 on the sector plate 40 and the pin member 36 spring biases the sector plate 40, and thus the seatback means 28, toward the forwardly folded position. The manually grippable handle means 80 is operatively connected to the primary latch means 60 via the pin member 36. If desired, a slave cable (not shown) may be interconnected between the manually grippable handle means 80 and a primary latch means (not shown) on a second vehicle seat hinge (not shown) associated with the opposite other side vehicle seat 24, so as to translate motion of the handle means 80 to such other primary latch means (not shown). Such use of a slave cable mechanism to translate actuatory motion to a second vehicle seat hinge means is well known in the art.

The first release position of the manually grippable handle means 80 corresponds to the latched configuration of the primary latch means 60 and the latched configuration of the secondary latch means 70. In the first release position, the manually grippable handle means 80 effects the unlatched configuration of the primary latch means 60, thereby permitting pivotal folding, as aforesaid, of the vehicle seatback means 28 about the first lower pivot axis "A" between the plurality of angular positions.

An elongate link arm means 90 is operatively interconnected between the secondary latch means 70 and the vehicle seat cushion means 26. In the first embodiment as illustrated, the link arm means 90 has a first end 91 pivotally connected to the vehicle seat cushion means 26 by means of a mounting pin 35 secured to the mounting plate 30, as can be seen in FIGS. 3, 5, 6, 7, and 8, and as can be best seen in FIG. 4. The second end 92 of the link arm means 90 further comprises an elongated slot 94 having a proximal end 94a disposed toward the first end 91 of the link arm means 90 and a distal end 94b disposed toward the second end 92 of the link arm means 90. As can be best seen in FIG. 4, the second end 92 of the link arm means 90 is operatively connected to the secondary latch means 70 by means of the pin member 79 mounted on the cam member 72, which pin member 79 engages the elongated slot 94 in lost-motion sliding relation to effect the operative connection between the link arm means 90 and the secondary latch means 70. The elongated slot 94 is positioned and dimensioned such that at the threshold position of the link arm means 90 and the secondary latch means 70, as is illustrated in FIGS. 6 and 6A, the pin member 79 is disposed at the distal end 94b of the elongated slot 94 in load bearing relationship to effect the movement of the secondary latch means 70 to the unlatched configuration as shown in FIG. 7.

The elongate link arm means 90 is operatively interconnected between the secondary latch means 70 and the vehicle seat cushion means 26 as described, for movement of the secondary latch means 70 from the latched configuration to the unlatched configuration upon relative movement of the link arm means 90 and the pin member 79 of the secondary latch means 70 with respect to each other beyond the threshold position illustrated in FIG. 6. In the first embodiment, the relative movement of the link arm means 90 and the secondary latch means 70 with respect to each other occurs upon forwardly folded pivotal movement of the vehicle seatback means 28 about the first lower pivot axis "A" following the movement of the handle means 80 to the first released position. In this manner, the vehicle seatback means 28 is released so as to be forwardly foldable over the vehicle seat cushion means 26 about the second upper pivot axis "B", as aforesaid, to a forwardly dumped position, as can be best seen in FIG. 8.

Figure 4:
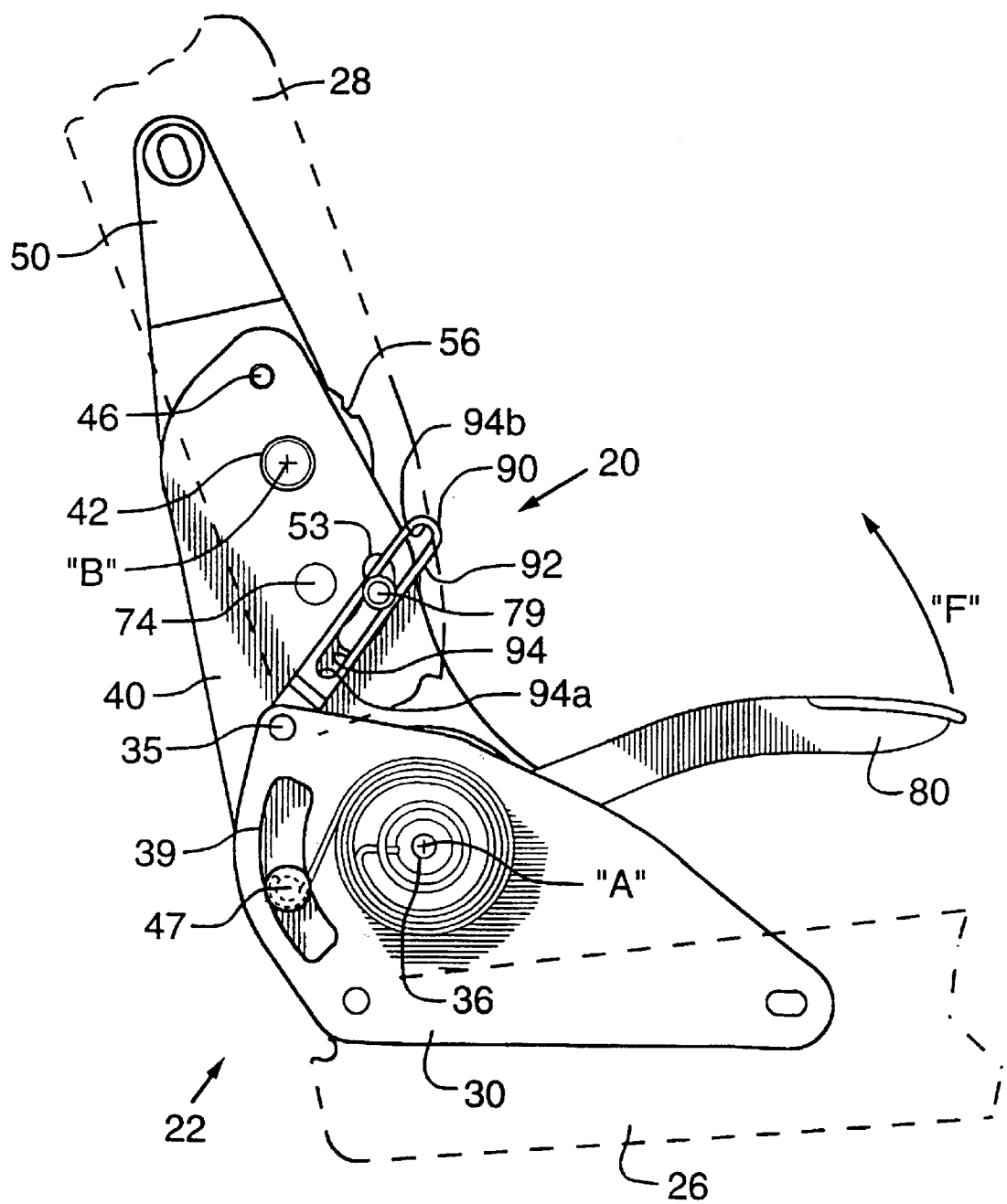
FIG. 4 is a right side elevational view of the embodiment of the single control handle release mechanism of FIG. 3.
Figure 5:
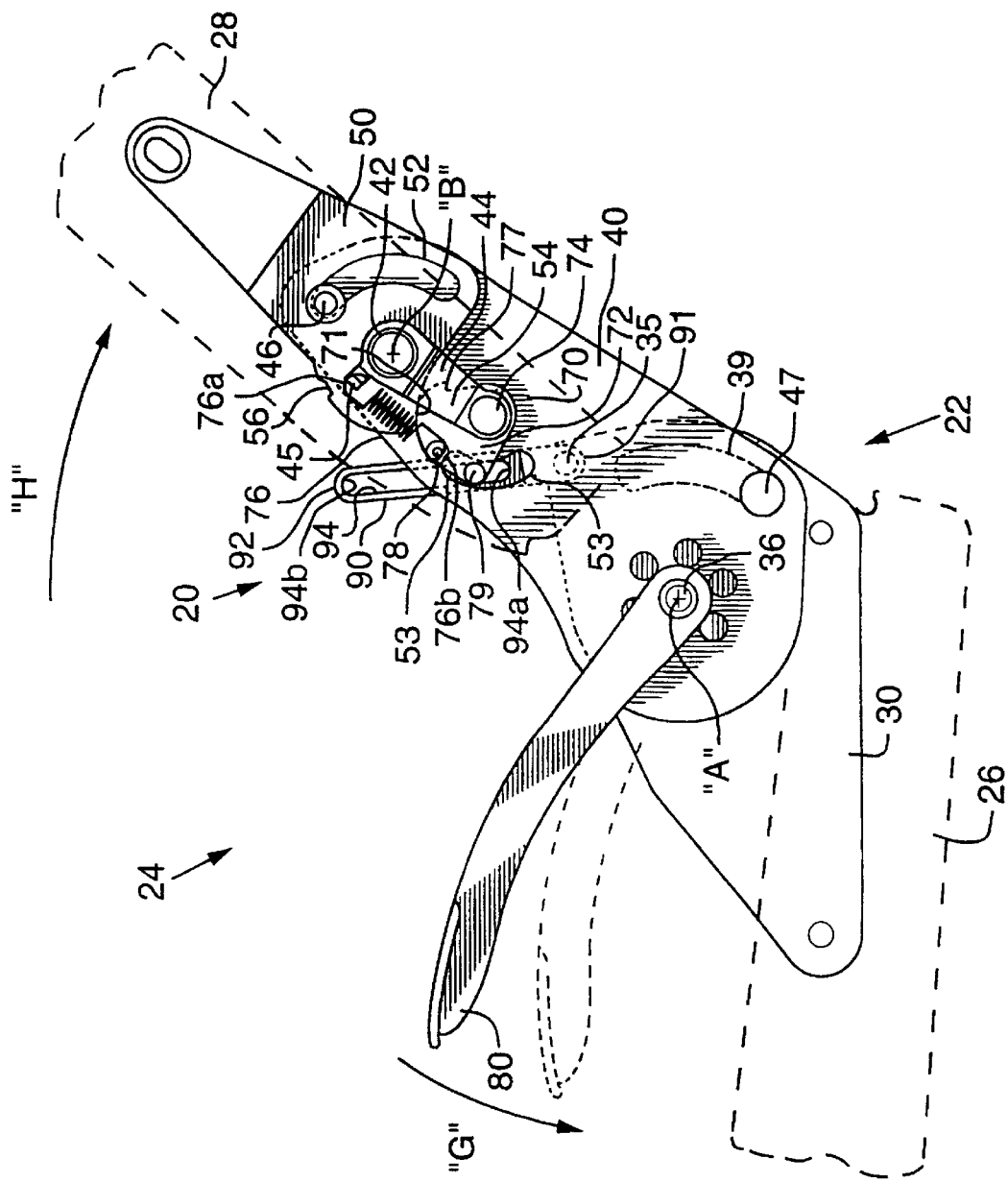
FIG. 5 is a view similar to FIG. 3, but with the seatback in a reclined position.

In use, in order to position the vehicle seatback means 28 in its forwardly dumped position, as can be best seen in FIG. 8, the handle means 80 is rotated from an initial position, as can be best seen in FIGS. 3 and 4, by being manually lifted, as indicated by arrows "E" and "F", to the first release position, as can be best seen in FIGS. 6 and 7, to thereby unlatch the primary latch means 60. The vehicle seatback means 28 is then initially folded forwardly by hand to the position shown in FIG. 6, as indicated by arrow "I". During this initial forward folding of the vehicle seatback means 28, the pin member 79 engages the elongated slot 94 in lost-motion sliding relation until it reaches the threshold position, as described above, and as can be best seen in FIGS. 6 and 6A. The vehicle seatback means 28 is then folded forwardly even more by the user to the position shown in FIG. 7, as indicated by arrow "J", to effect the operative connection between the link arm means 90 and the secondary latch means 70, thus unlatching the secondary latch means 70. The vehicle seatback means 28 may then be further forwardly folded, as indicated by arrow "K" in FIG. 8, to the substantially horizontal forwardly dumped position, as defined by the stop pin 46 engaged in the sectoral slot 52. The vehicle seatback means 28 is locked in the substantially horizontal forwardly dumped position by means of co-operative interlocking of the projecting tooth member 77 with the notch 56. The handle means 80 is then released and returns under the influence of the previously mentioned internal spring biasing (not shown) of the primary latch means 60 to its initial position, as indicated by arrow "L" in FIG. 8. The vehicle seatback means 28 may be released from being locked in the forwardly dumped position by mere lifting by the use of the seatback means 28 with only slightly more than a minimal force, as discussed above, due to the co-operating profiles of the notch 56 and the tooth member 77.

Figure 9:
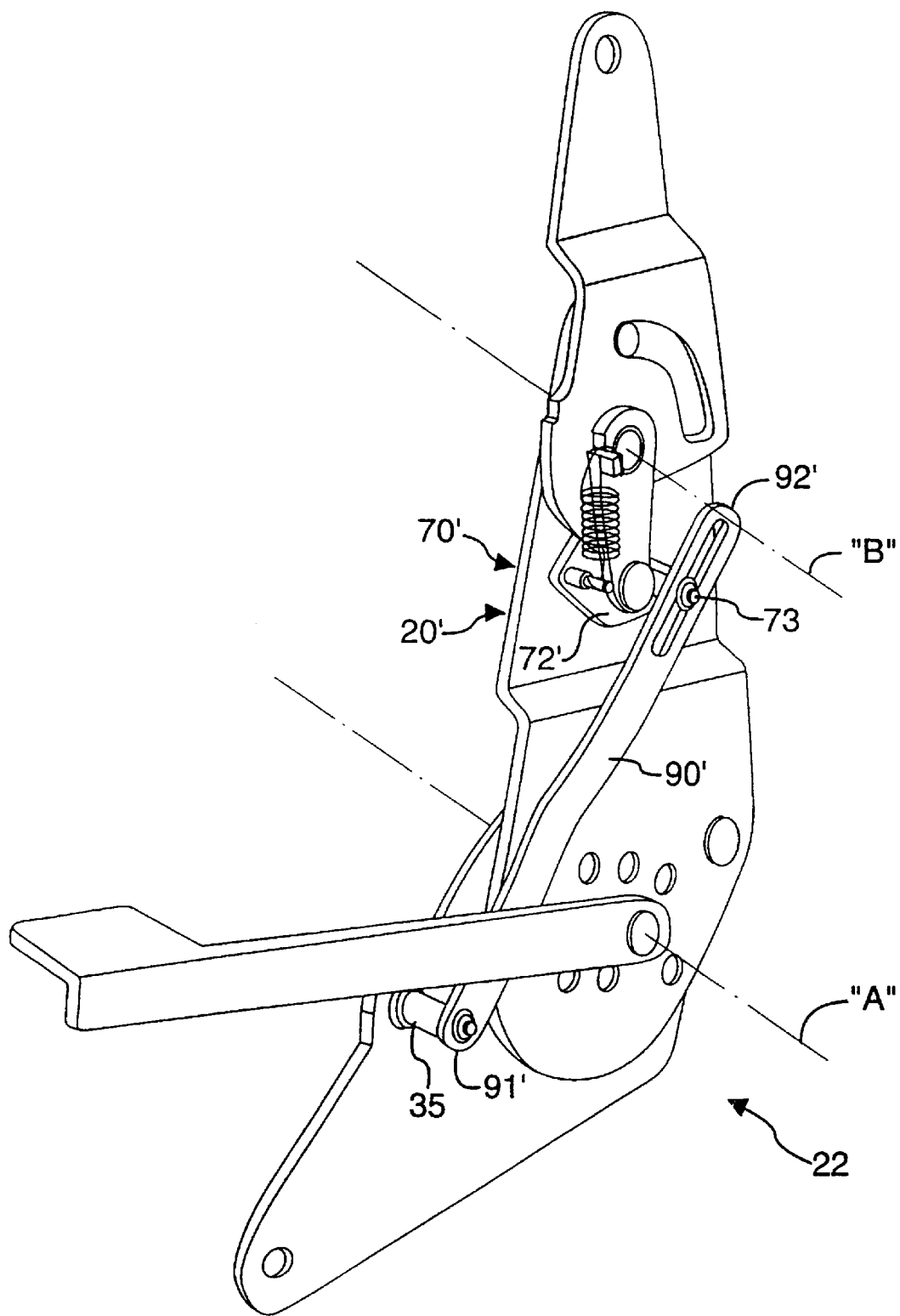
FIG. 9 is a perspective view from the front left of a second embodiment of the single control handle release mechanism according to the present invention.
Figure 10:
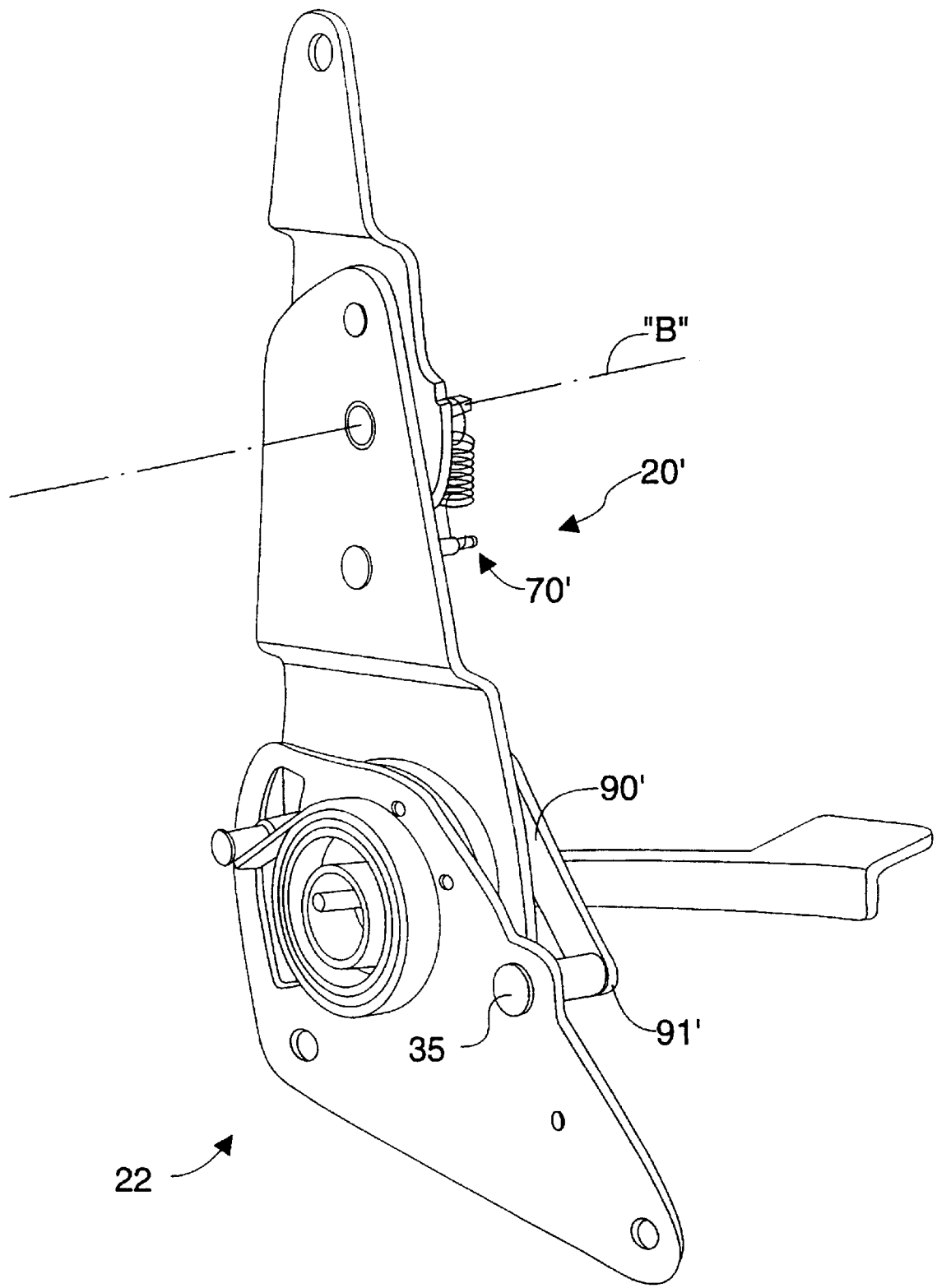
FIG. 10 is a perspective view from the front right of the second embodiment of the single control handle release mechanism of FIG. 10.
Figures 11, 11A:
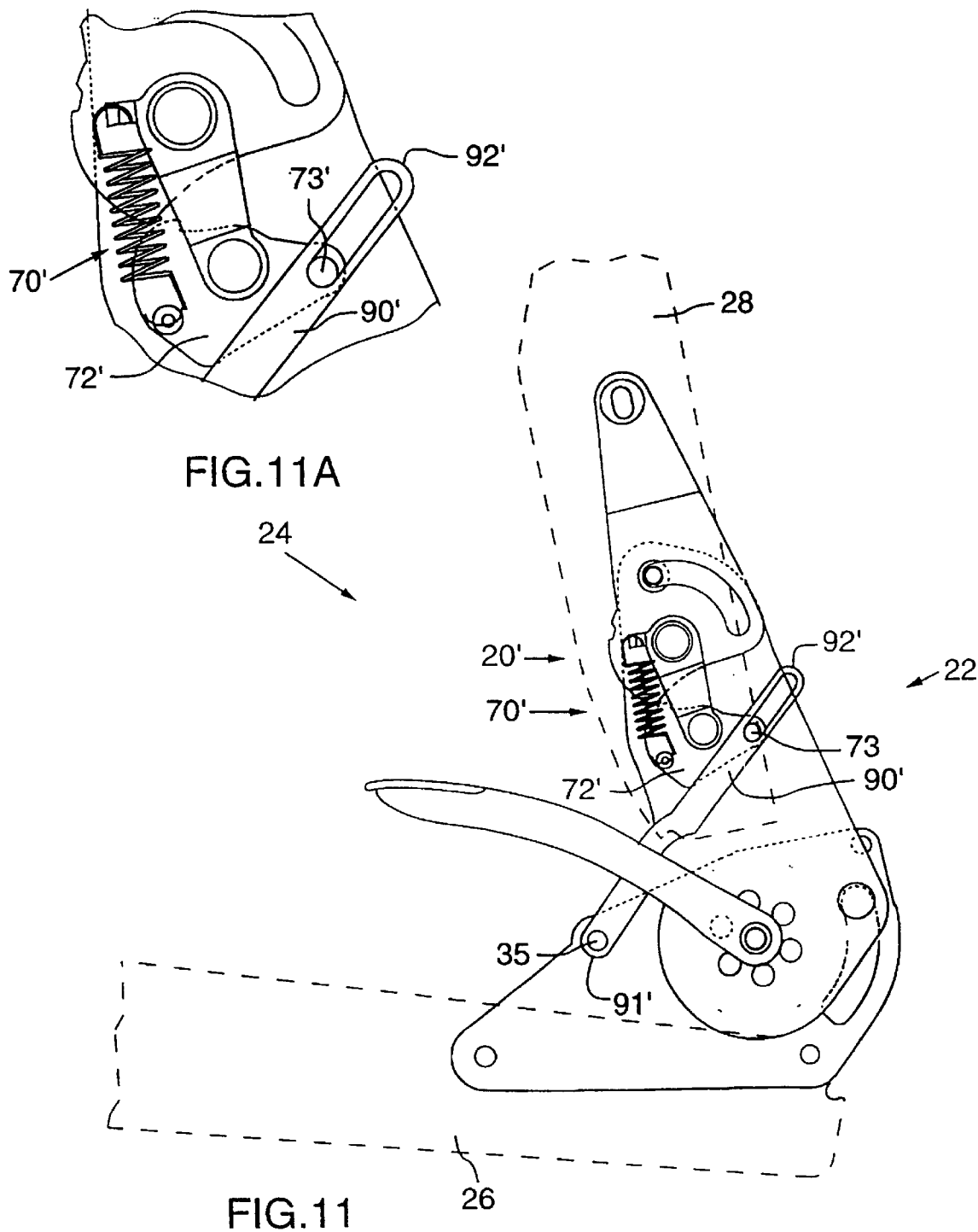
FIG. 11 is a left side elevational view of the second embodiment of the single control handle release mechanism of FIG. 9, with the single control handle release mechanism installed in a vehicle seat and with the seatback of the seat partially folded forwardly about the first lower pivot axis, and with the link arm means and the secondary latch means shown in a threshold position.
FIG. 11A is an enlarged view of a portion of FIG. 11, showing the secondary latch means in a latched configuration.
Figure 12:
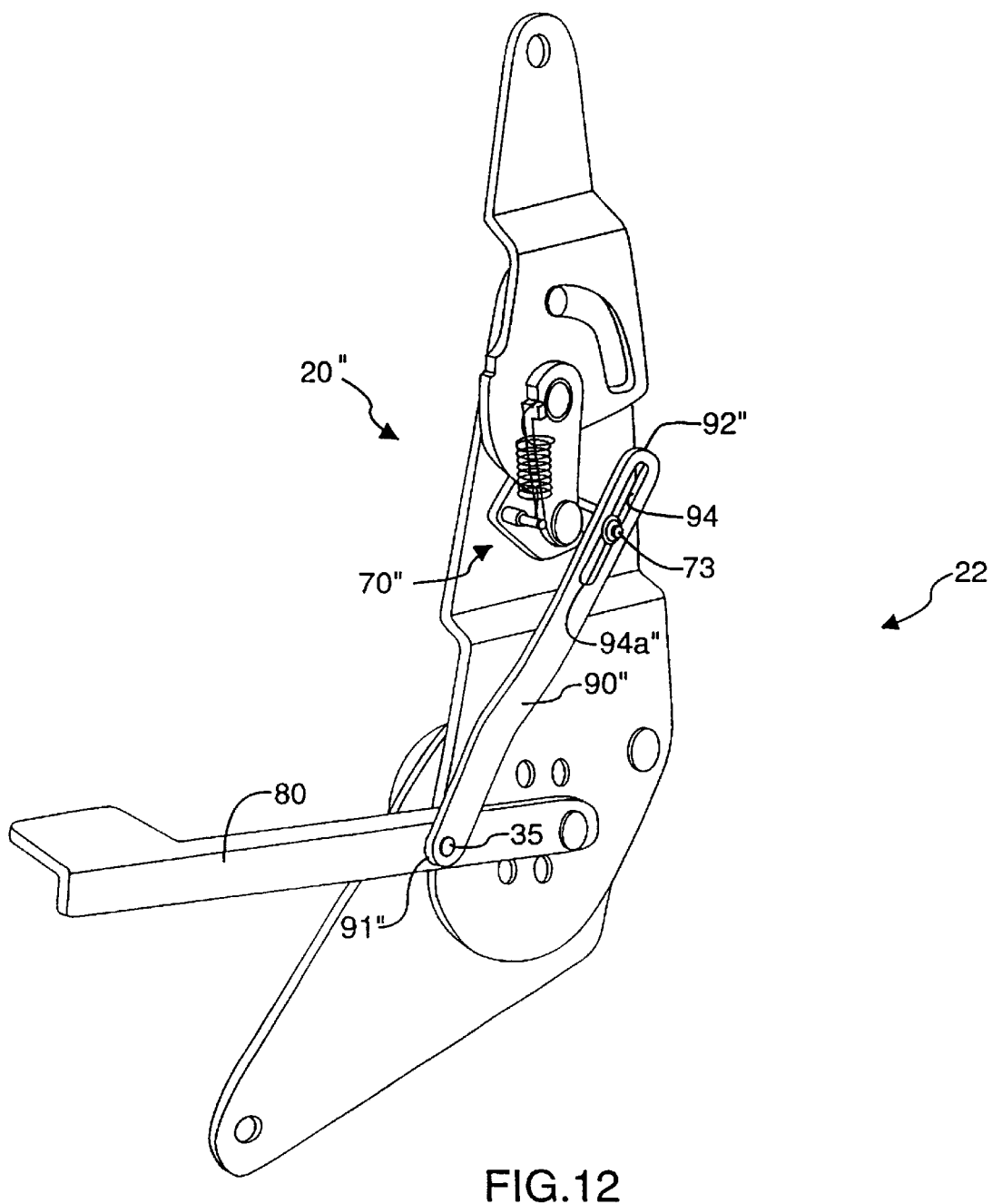
FIG. 12 is a perspective view from the front left of a third embodiment of the single control handle release mechanism according to the present invention.
Figure 13:
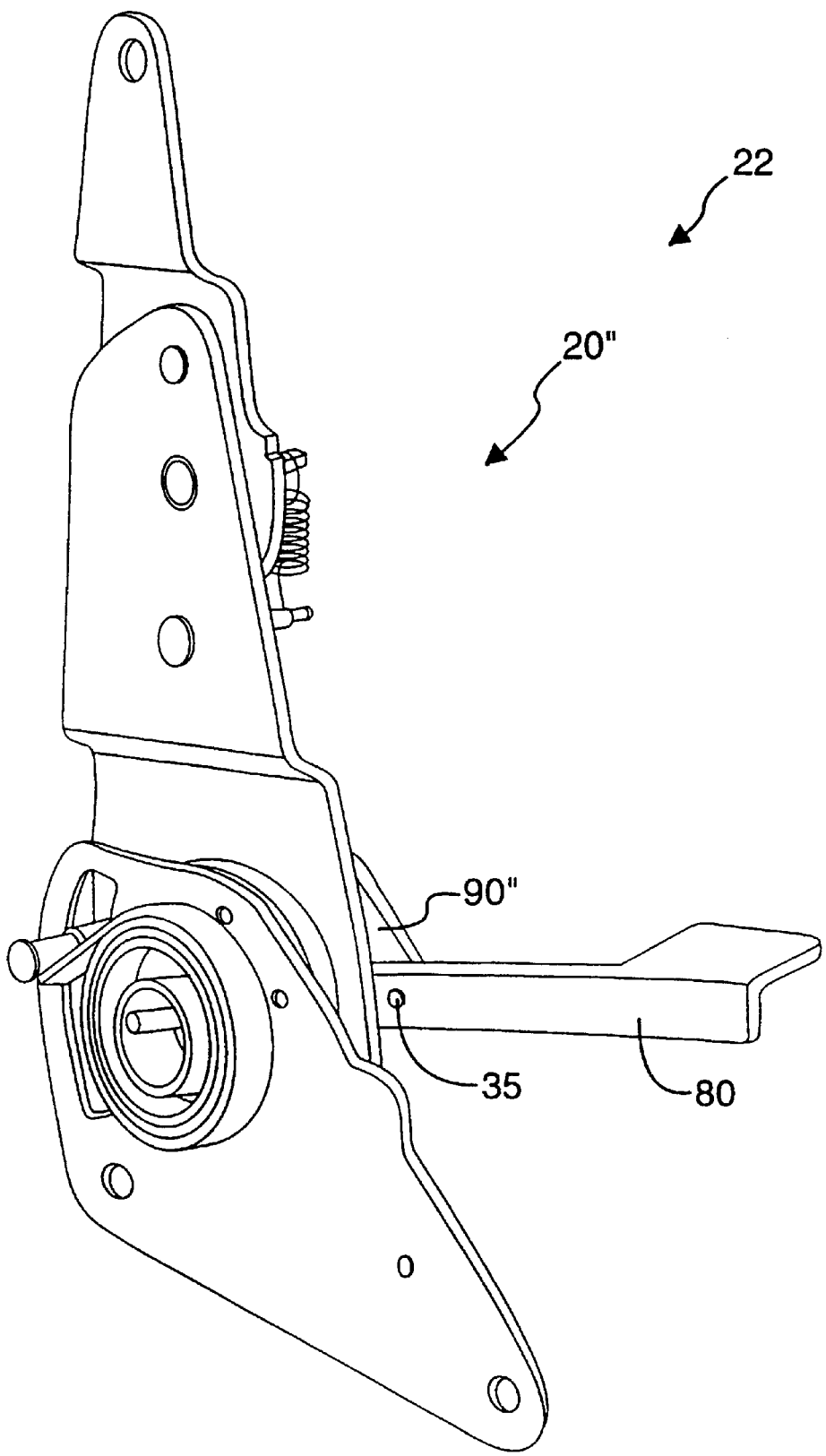
FIG. 13 is a perspective view from the front right of the third embodiment of the single control handle release mechanism of FIG. 12.

Referring now to FIGS. 9, 10 and 11 of the drawings, there is shown a second embodiment of the single control handle release mechanism of the present invention, as indicated by the general reference numeral 20'. The second embodiment single control handle release mechanism 20' is structurally and functionally similar to the first preferred embodiment single control handle release mechanism 20, except for the specific interconnection and operation of the link arm means 90'. The first end 91' of the link arm means 90' is pivotally connected to the vehicle seat cushion means 26 by means of a mounting pin 35 secured to the mounting plate 30, forwardly of the first lower pivot axis "A". The second end 92' of the link arm means 90' is operatively connected to the pin member 79 mounted on the cam member 72l, which pin member 79 engages the elongated slot 94' in lost-motion sliding relation to effect the operative connection between the link arm means 90' and the secondary latch means 70. The elongated slot 94' is positioned and dimensioned such that, at the threshold position of the link arm means 90' and the secondary latch means 70, as is illustrated in FIGS. 11 and 11A, the pin member 79 is disposed at the proximal end 94a' of the elongated slot 94 in load bearing relationship to effect the movement of the secondary latch means 70 to the unlatched configuration upon continued forward folding of the vehicle seatback means 28.

Referring now to FIGS. 12 through 16 of the drawings, there is shown a third embodiment of the single control handle release mechanism of the present invention, as indicated by the general reference numeral 20". The third embodiment single control handle release mechanism 20" is structurally and functionally similar to the second preferred embodiment single control handle release mechanism 20', except for the specific interconnection and operation of the link arm means 90". The first end 91" of the link arm means 90" is pivotally connected to the vehicle seat cushion means 26 via the manually grippable handle means 80, by means of a mounting pin 35 secured to the handle means 80, such that the link arm means 90" moves in concert with movement of the manually grippable handle means 80. The second end 92" of the link arm means 90" is operatively connected to the pin member 79 mounted on the cam member 72', which pin member 79 engages the elongated slot 94" in lost-motion sliding relation to effect the operative connection between the link arm means 90" and the secondary latch means 70".

Figure 14:
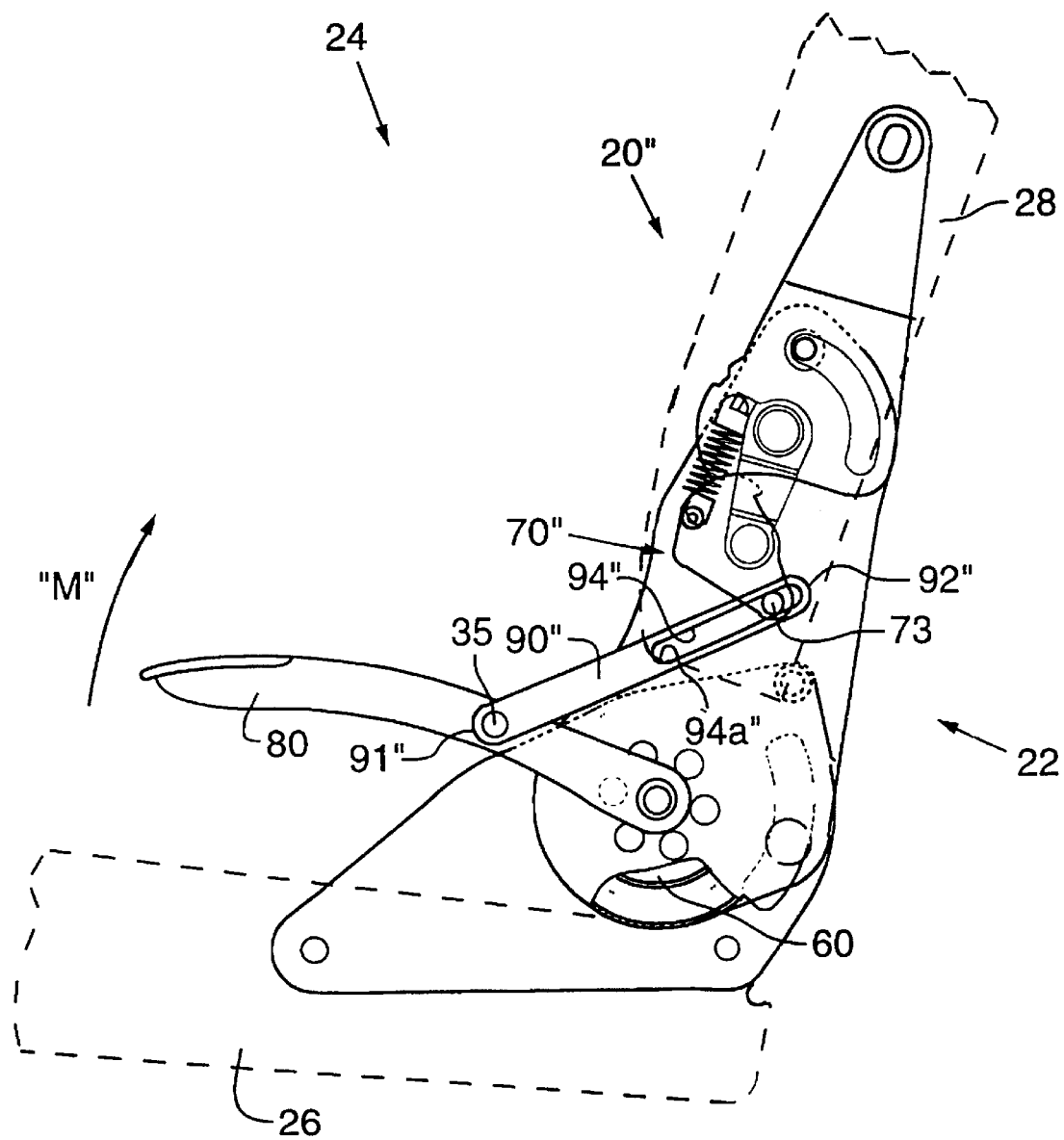
FIG. 14 is a left side elevational view of the third embodiment of the single control handle release mechanism of FIG. 12, with the single control handle release mechanism installed in a vehicle seat and with the seatback of the seat in an upright design position.
Figure 15:
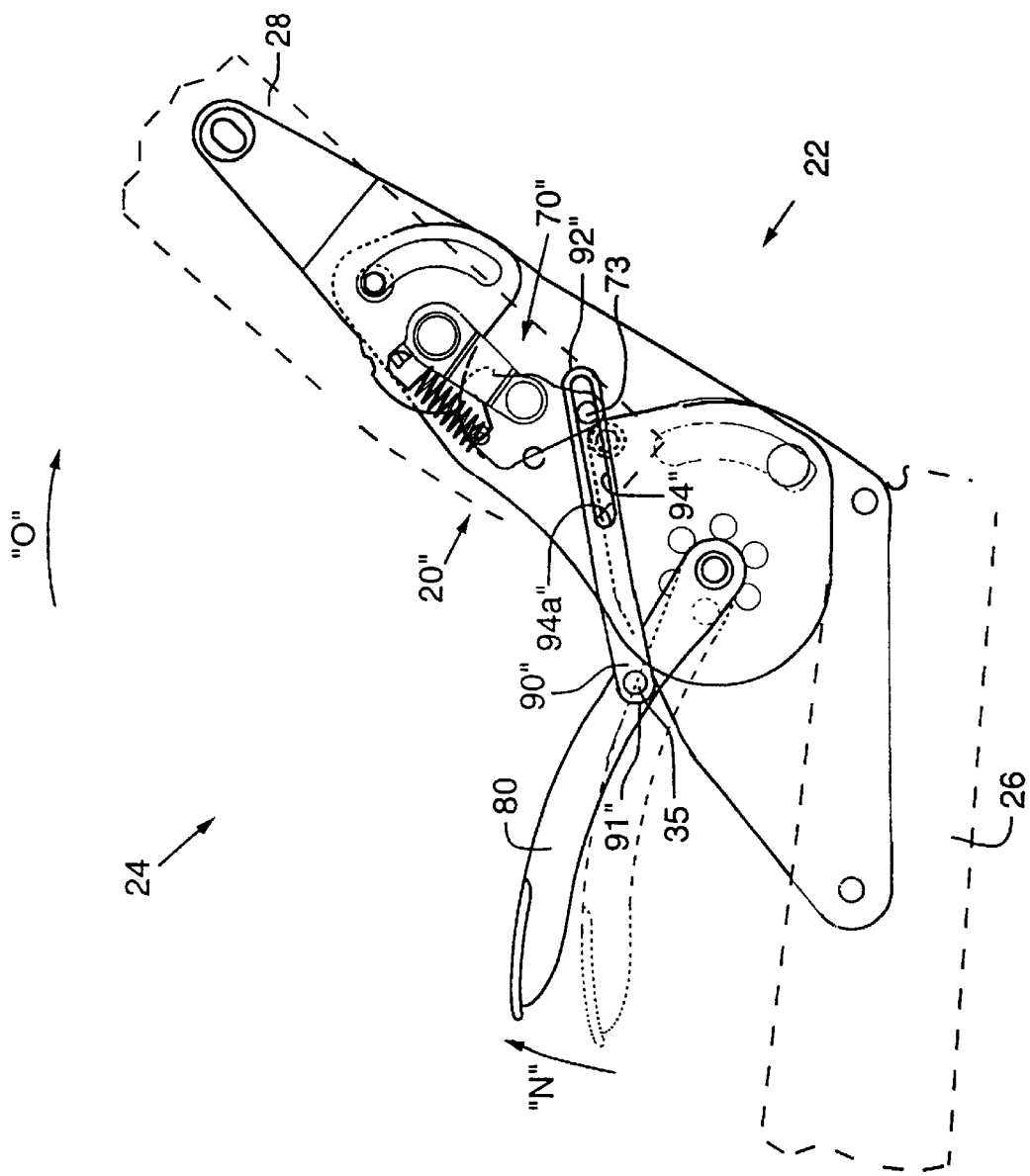
FIG. 15 is a view similar to FIG. 14, but with the seatback in a reclined position.
Figure 16:
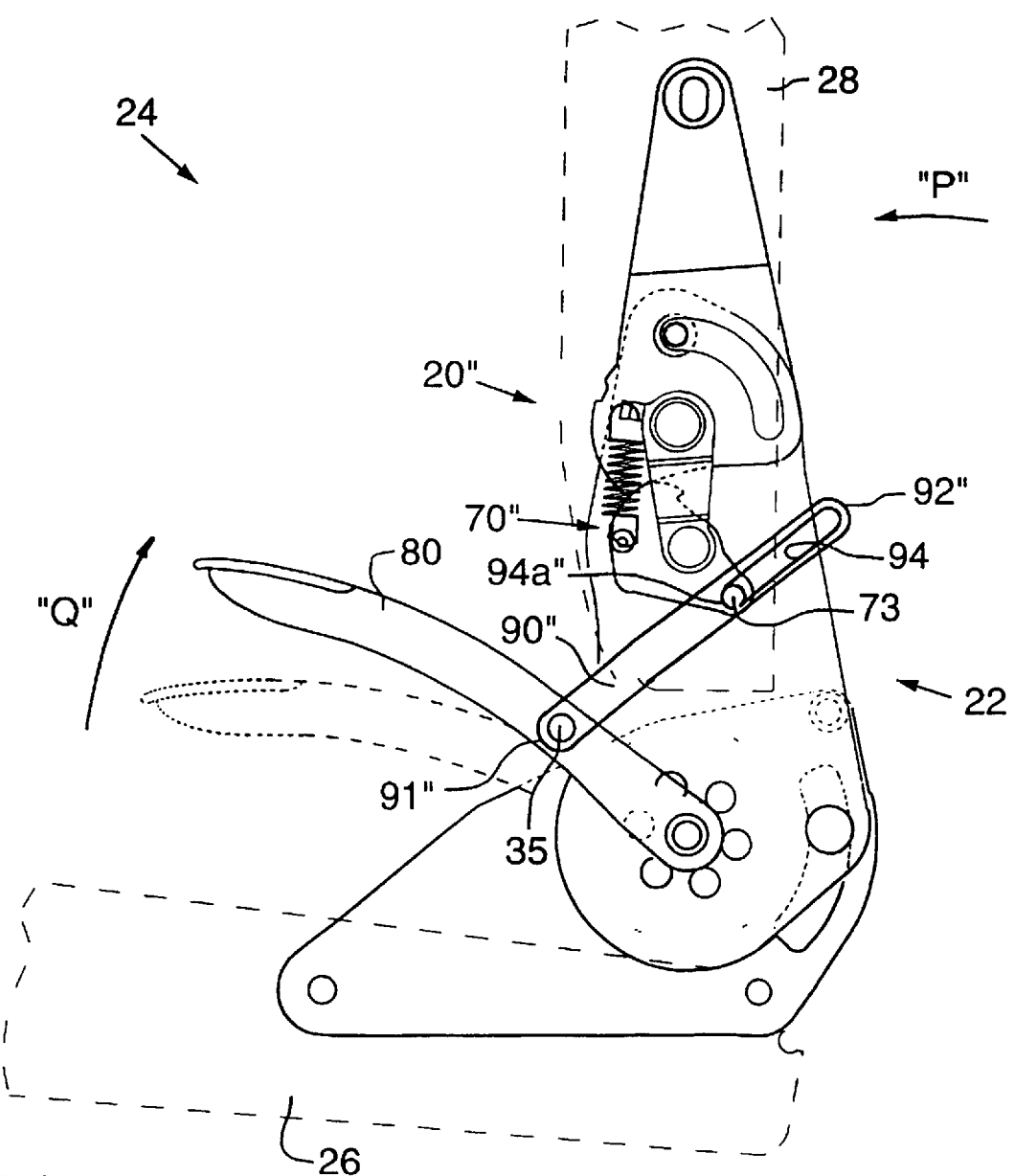
FIG. 16 is a view similar to FIG. 15, but with the seatback partially folded forwardly about the first lower pivot axis, and with the link arm means and the secondary latch means in a threshold position; and, FIG. 17 is a view similar to FIG. 16, but with the seatback folded forwardly slightly more than FIG. 16 about the first lower pivot axis.

As in the second embodiment of the single control handle release mechanism 20' of the present invention, the manually grippable handle means 80 is mounted for rotatable movement, as indicated by arrow "M", and "N" in FIGS. 14, and 15, respectively, from an initial position, as is shown in solid lining in FIG. 14 and as is shown in dashed lining in FIG. 15, to a first release position, as is shown in solid lining in FIGS. 15 and as is shown in dashed lining in FIG. 16. The manually grippable handle means 80 is (as previously described) used to selectively move the primary latch means 60 from the latched configuration to the unlatched configuration, thus permitting reclining of the vehicle seatback means 28, as indicated by arrow "H" in FIG. 15, to a reclined position as shown, or to permit initial forward folding of the vehicle seatback means 28, as indicated by arrow "P" in FIG. 16.

As can be best seen in FIG. 16, the manually grippable handle means 80 is further movable, as indicated by arrow "Q", from the first release position, as shown in dashed outline, through a threshold handle position, as shown in solid lining, whereat the link arm means 90" has been carried by movement of the handle means 80 to the threshold position of the link arm means 90" and the secondary latch means 70'. At the threshold position of the link arm means 90" and the secondary latch means 70", the pin member 79 is disposed at the proximal end 94a" of the elongated slot 94" in load bearing relationship to effect the movement of the secondary latch means 70 tho the unlatched configuration.

Figure 17:
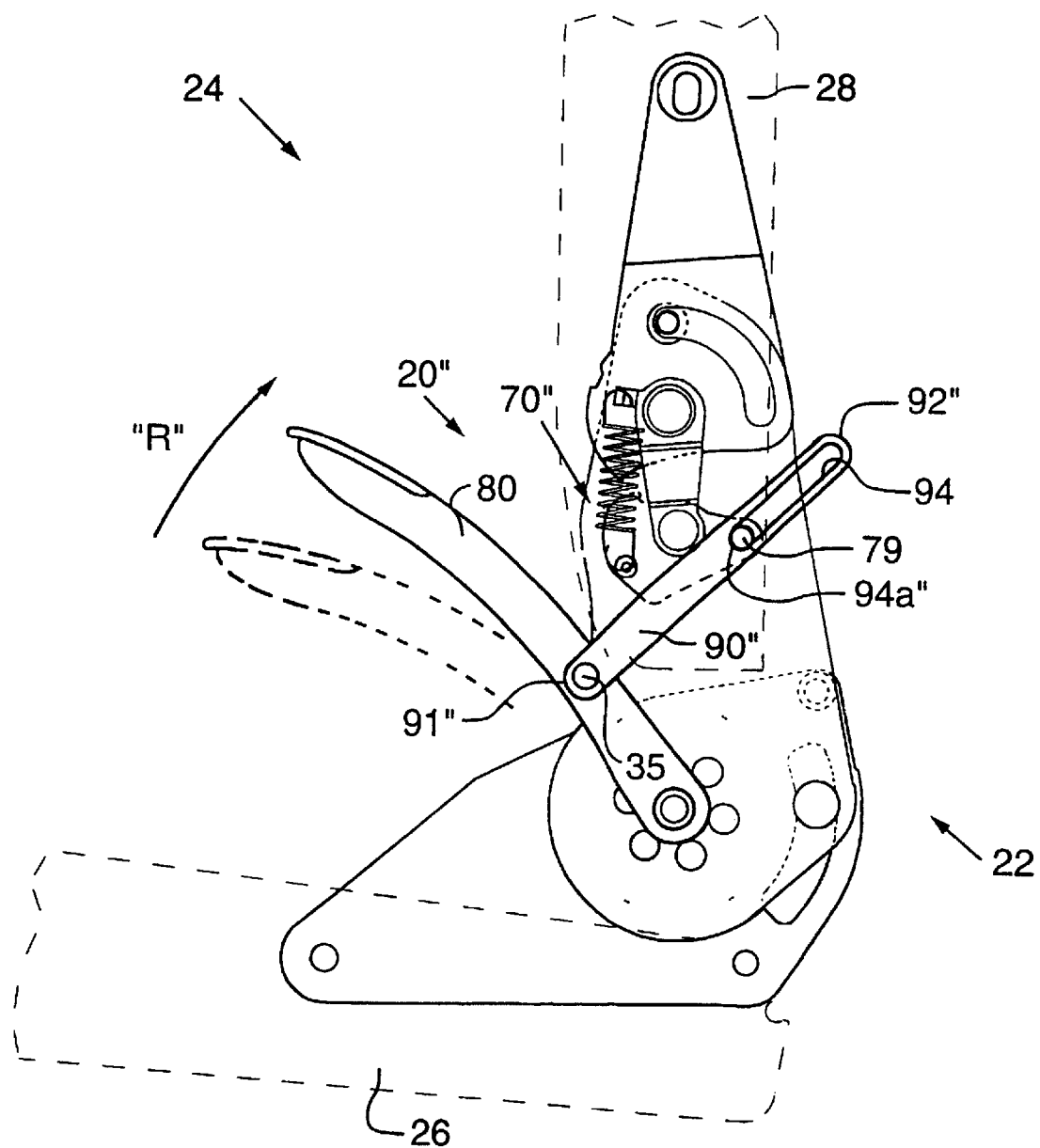

The manually grippable handle means 80 is still further movable, as indicated by arrow "R" in FIG. 17, to a second release position, as is shown in solid lining in FIG. 17, beyond the threshold position of the link arm means 90" and the secondary latch means 70" so to effect the movement of the secondary latch means 70" to the unlatched configuration, as aforesaid.

Other variations of the above principles will be apparent to those who are knowledgeable in the field of the invention, and such variations are considered to be within the scope of the present invention. Further, other codifications and alterations may be used in the design and manufacture of the apparatus of the prese invention without departing from the scope of the accompanying claims.

I claim:

1. A single control handle release mechanism for use with a vehicle seat hinge having a mounting plate securely attachable to a vehicle seat cushion, a sector plate pivotally mounted on said mounting plate for selective pivotal movement about a first lower pivot axis, and a rotational control plate pivotally mounted on said sector plate for selective pivotal movement about a second upper pivot axis and securely attachable to a vehicle seatback, wherein, when said vehicle seat hinge is installed in a vehicle seat, said vehicle seatback is pivotally movable with respect to said vehicle seat cushion about said first lower pivot axis between a plurality of angular positions and forwardly foldable with respect to said vehicle seat cushion about said second upper pivot axis between a design position and a forwardly dumped position, said single control handle release mechanism having:

a primary latch means operatively interconnected between said mounting plate and said sector plate so as to be selectively movable between a latched configuration whereat said mounting plate and said sector plate are pivotally fixed with one with respect to the other, and an unlatched configuration whereat said mounting plate and said sector plate are free to pivot about said first lower pivot axis such that said vehicle seatback is pivotally movable, as aforesaid, between said plurality of angular positions;

a secondary latch means operatively interconnected between said sector plate and said rotational control plate so as to be selectively movable between a latched configuration whereat said sector plate and said rotational control plate are pivotally fixed one with respect to the other, and an unlatched configuration whereat said sector plate and said rotational control plate are free to forwardly fold, as aforesaid, between said design position and said forwardly dumped position;

a manually grippable handle means rotatably mounted on said seat cushion and operatively connected to said primary latch means, for movement from an initial position, corresponding to said latched configuration of said primary latch means and said latched configuration of said secondary latch means, to a first release position, at said first release position said manually grippable handle means effects said unlatched configuration of said primary latch means, thereby permitting pivotal folding, as aforesaid, of said vehicle seatback about said first lower pivot axis between said plurality of angular positions; wherein the improvement comprises:

an elongate link arm having a first end pivotally mounted on said vehicle seat cushion and a second end operatively connected to said secondary latch means for movement of said secondary latch means from said latched configuration to said unlatched configuration upon relative movement of said link arm and said secondary latch means with respect to each other beyond a threshold position, thereby to release said vehicle seatback to be forwardly foldable over the vehicle seat cushion about said second upper pivot axis, as aforesaid, and wherein said first end of the link arm is pivotally mounted as aforesaid on the mounting plate and wherein said relative movement of said link arm and said secondary latch means with respect to each other occurs upon forwardly folded pivotal movement of said vehicle seatback about said first lower pivot axis following said movement of the handle means to said first released position.

2. The single control handle release mechanism of claim 1, wherein the second end of said link arm further comprises an elongated slot having a proximal end disposed toward said first end of said link arm and a distal end disposed toward said second end of said link arm, and wherein said secondary latch means includes a pin member, said pin member engages said elongated slot in lost-motion sliding relation to effect said operative connection between said link arm and said secondary latch means.

3. The single control handle release mechanism of claim 2, wherein said elongated slot is positioned and dimensioned such that, at said threshold position of said link arm and said secondary latch means, said pin member is disposed at said proximal end of said elongated slot in a load bearing relationship to effect said movement of the secondary latch means to said unlatched configuration.

4. The single control handle release mechanism of claim 3, wherein said secondary latch means essentially comprises a cam member having a camming surface, said cam member being mounted on said sector plate for pivotal movement between a latched configuration corresponding to said latched configuration of said secondary latch means, whereat said camming surface latchingly engages a cam receiving surface on said rotational control plate, and an unlatched configuration corresponding to said unlatched configuration of said secondary latch means, whereat said camming surface is removed from being latchingly engaged with said cam receiving surface.

5. The single control handle release mechanism of claim 4, wherein said cam member is spring biased toward said latched configuration.

6. The single control handle release mechanism of claim 5, wherein said primary latch means comprises a known reclining adjustment mechanism.

7. The single control handle release mechanism of claim 6, wherein said secondary latch means further comprises means for releasably locking said vehicle seatback in said forwardly dumped position.

8. The single control handle release mechanism of claim 7, wherein said means for releasably locking said vehicle seatback in said forwardly dumped position comprises a notch disposed in said rotational control plate and a projecting tooth member disposed on said cam member for co-operative interlocking with said notch when said vehicle seatback member is in said forwardly dumped position.

9. The single control handle release mechanism of claim 2, wherein said elongated slot is positioned and dimensioned such that at said threshold position of said link arm and said secondary latch means, said pin member is disposed at said distal end of said elongated slot in a load bearing relationship to effect said movement of the secondary latch means to said unlatched configuration.

10. The single control handle release mechanism of claim 9, wherein said secondary latch means essentially comprises a cam member having a camming surface, said cam member being mounted on said sector plate for pivotal movement between a latched configuration corresponding to said latched configuration of said secondary latch means, whereat said camming surface latchingly engages a cam receiving surface on said rotational control plate, and an unlatched configuration corresponding to said unlatched configuration of said secondary latch means, whereat said camming surface is removed from being latchingly engaged with said cam receiving surface.

11. The single control handle release mechanism of claim 10, wherein said cam member is spring biased toward said latched configuration.

12. The single control handle release mechanism of claim 11, wherein said primary latch means comprises a known reclining adjustment mechanism.

13. The single control handle release mechanism of claim 12, wherein said secondary latch means further comprises means for releasably locking said vehicle seatback in said forwardly dumped position.

14. The single control handle release mechanism of claim 13, wherein said means for releasably locking said vehicle seatback in said forwardly dumped position comprises a notch disposed in said rotational control plate and a projecting tooth member disposed on said cam member for co-operative interlocking with said notch when said vehicle seatback member is in said forwardly dumped position.

15. The single control handle release mechanism of claim 14, wherein said means for releasably locking said vehicle seatback means in said forwardly dumped position comprises a notch disposed in said rotational control plate and a projecting tooth member disposed on said cam member for co-operative interlocking with said notch when said vehicle seatback member is in said forwardly dumped position.

* * * * *